(12) United States Patent
DePue et al.

(10) Patent No.: US 8,725,461 B2
(45) Date of Patent: May 13, 2014

(54) INFERRING EFFECTS OF CONFIGURATION ON PERFORMANCE

(75) Inventors: Adam C. DePue, Kirkland, WA (US); Mark Gilbert, Seattle, WA (US); Prasanna Kumar Jayapal, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 324 days.

(21) Appl. No.: 13/113,108

(22) Filed: May 23, 2011

(65) Prior Publication Data

US 2012/0303325 A1    Nov. 29, 2012

(51) Int. Cl.
*G06F 11/30* (2006.01)

(52) U.S. Cl.
USPC .......................................... 702/186; 709/224

(58) Field of Classification Search
CPC .................................................. G06F 11/3419
USPC ....................................................... 702/186
See application file for complete search history.

(56) References Cited

U.S. PATENT DOCUMENTS

| | | | |
|---|---|---|---|
| 7,346,131 B2 | 3/2008 | Galperin et al. | |
| 7,620,612 B1 | 11/2009 | Vijendra et al. | |
| 7,769,847 B2 | 8/2010 | Lewis | |
| 2005/0138168 A1* | 6/2005 | Hoffman et al. | 709/224 |
| 2010/0192013 A1 | 7/2010 | Krishnan et al. | |
| 2010/0332638 A1 | 12/2010 | Lewis | |

OTHER PUBLICATIONS

Yan, et al., "G-RCA: A Generic Root Cause Analysis Platform for Service Quality Management in Large IP Networks", Retrieved at << http://conferences.sigcomm.org/co-next/2010/CoNEXT_papers/05-Yan.pdf >>, Proceedings of the ACM Conference on Emerging Networking Experiments and Technology, CoNEXT, Nov. 30-Dec. 3, 2010, pp. 12.
Kandula, et al., "Detailed Diagnosis in Enterprise Networks", Retrieved at << http://ccr.sigcomm.org/online/files/p243.pdf >>, ACM SIGCOMM Conference, Aug. 17-21, 2009, pp. 243-254.
"The eG Approach to Root-Cause Analysis", Retrieved at << http://www.egmonitor.com.cn/whitepaper/rca-whitepaper.pdf >>, White Paper, Copyright Notice Date: 2003, pp. 8.
Rish, et al., "Efficient fault diagnosis using probing", Retrieved at << http://www.research.ibm.com/RAIL/papers/AAAI02symp-probe.pdf >>, Copyright Notice Date: 2002, pp. 8.

* cited by examiner

*Primary Examiner* — John Breene
*Assistant Examiner* — Haihui Zhang
(74) *Attorney, Agent, or Firm* — Jim Sfekas; Kate Drakos; Micky Minhas

(57) ABSTRACT

Configuration data and performance data can be collected from computing machines running a target program. Periods of stress for the computing machines can be identified using the performance data, and a set of the computing machines can be grouped under a stress profile using the performance data. One or more configuration points can be identified on the set of machines, and an effect of each of the configuration point(s) on performance of the set of machines can be inferred using the configuration data and the performance data. The inferred effect(s) of the configuration point(s) can be used to determine a baseline set of configuration settings.

20 Claims, 5 Drawing Sheets

SOFTWARE 180 IMPLEMENTING INFERRING EFFECTS OF CONFIGURATION ON PERFORMANCE

INFERRING EFFECTS OF CONFIGURATION ON PERFORMANCE

BACKGROUND

Virtual and/or physical computing machines that are running applications can undergo times of stress. For example, a machine may be stressed when it has a large volume of network requests being serviced, when it has a large amount of its processing or memory capacity being used at a particular time or for an extended period of time, when a large number of requests (e.g., write requests or read requests) are queued at a particular time or for an extended period of time, etc. During those times of stress, the machines' performance can be positively or negatively affected by one or more configuration settings (e.g., registry keys, file versions, number of network cards, etc.). Identifying those settings that can have a positive or negative effect on a machine's performance under stress has generally been done with a trial-and-error approach.

Some systems facilitate collection of information from computer systems and applications. Such systems can provide and report information that may assist in identifying issues with product design or code.

SUMMARY

The tools and techniques described herein relate to inferring the effects of configuration points on the performance of computing machines to which those configuration points apply. As used herein, configuration points are points of configurations that can be changed to different values, i.e., different configuration settings. For example, a configuration point may be able to have configuration settings that are numerical values within some range. As another example, a configuration point may have configuration settings that can be varied between on and off, or some similar indication (yes or no, high or low, etc.). As yet another example, a configuration point may have configuration settings that can be varied between a discreet number of different options, such as options selected from a menu.

In one embodiment, the tools and techniques can include collecting configuration data and performance data from computing machines running a target program. Periods of stress for the computing machines can be identified using the performance data, and a set of the computing machines can be grouped under a stress profile using the performance data. One or more configuration points can be identified on the set of machines, and an effect of each of the configuration points on performance of the set of machines can be inferred using the configuration data and the performance data.

In another embodiment of the tools and techniques, periods of stress for computing machines running a target program can be identified by analyzing performance data. A set of the computing machines can be grouped under a stress profile using the performance data. Additionally, one or more configuration points on the set of machines can be identified, and an effect of each of those configuration point(s) on performance of the set of machines can be inferred using the performance data and configuration data for the set of machines. The inferred effect(s) of the configuration point(s) can be used to determine a baseline set of configuration settings.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
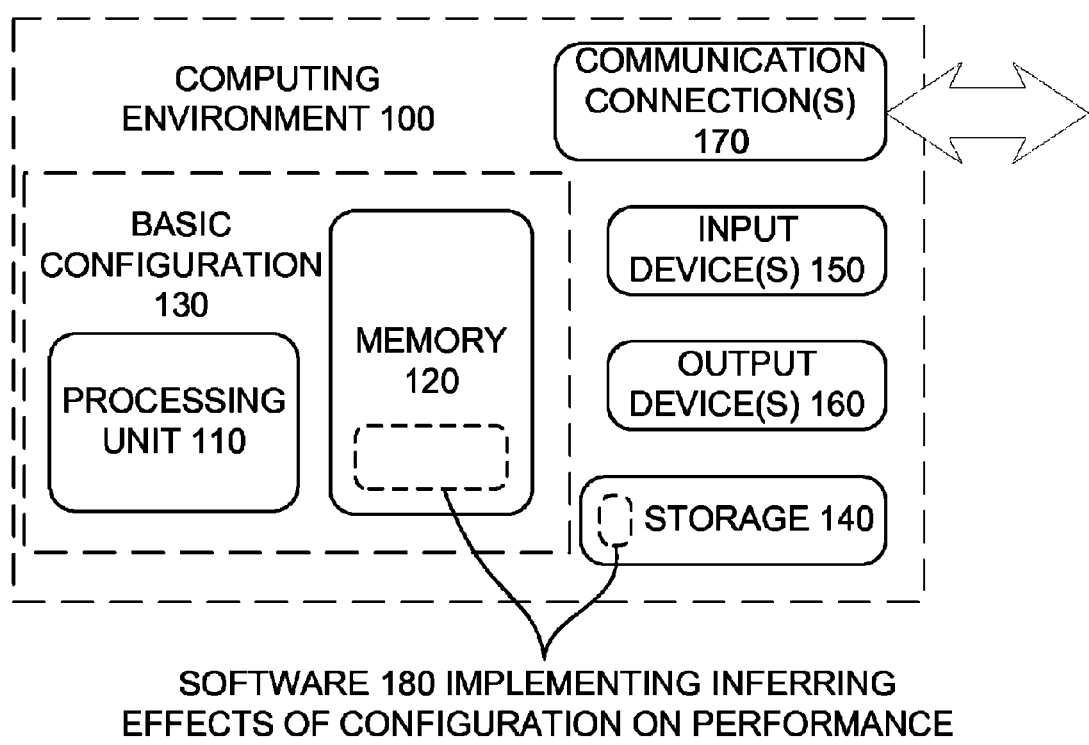
FIG. 1 is a block diagram of a suitable computing environment in which one or more of the described embodiments may be implemented.

Embodiments described herein are directed to techniques and tools for improved inference of how configuration points affect performance of computing machines. Such improvements may result from the use of various techniques and tools separately or in combination.

Such techniques and tools may include identifying a set of configuration settings that can be either positively or negatively related to a computing application's or computing machine's performance, such as performance of a server or application. Identification of these configuration settings can be done through mining of configuration and performance data collected from sets of computing machines running a target program being analyzed. The mining can include identifying periods of stress, grouping machines under similar stress, identifying configuration points on those machines, and inferring those configuration points' effect on performance of those machines. Such effects can be inferred using configuration data and performance data even if a definite causal mechanism between the configuration point or setting and the performance is not identified.

Using the inferred effects on performance, a baseline set of configuration settings can be determined. The baseline set of configuration settings may have one or more positive inferred effects on performance and/or avoid one or more negative inferred effects on performance. The settings in the baseline set may be represented in different ways, such as an option chosen from a discreet set of options, a numerical value, a range of values, a combination of values and/or options, a negatively-stated value or option (which includes values or options except specified values or options), etc.

Thus, the tools and techniques described herein can include deterministically using collected data to determine a set of performance levels and performance effects, related to configuration settings and performance under stress. A performance level is some behavior, seen on one or more instances of a technology. Performance levels can be identifiable via instrumentation of the running computing machines and/or or management systems that are managing the computing machines. A configuration point is a measurable group of one or more configuration settings that may affect one or more performance levels.

Over time the baseline configuration set for a target application can change due to updated versions of software and patches, changes in ambient conditions, and/or other changes. Accordingly, the tools and techniques described herein can allow for updating of baseline configuration sets to account for such changes and/or to fine-tune baseline configuration sets.

As noted above, data collected from a set of machines can be used to create baseline configuration sets and then used to suggest changes to be made on computing machines.

Accordingly, one or more benefits can be realized from the tools and techniques described herein. The baseline configuration sets can be determined/inferred from the sets of machines running a specific application under varying configurations and varying types of stress. The baseline configuration sets may be communicated to computing machines and/or used to suggest changes to be made to configuration settings on computing machines. Such changes may improve performance of those machines.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, dedicated hardware implementations, such as application specific integrated circuits, programmable logic arrays and other hardware devices, can be constructed to implement at least a portion of one or more of the techniques described herein. Applications that may include the apparatus and systems of various embodiments can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

FIG. 1 illustrates a generalized example of a suitable computing environment (100) in which one or more of the described embodiments may be implemented. For example, one or more such computing environments can be used as a computing machine providing data, a computing machine inferring effects of configuration on performance, and/or a computing machine that can implement configuration setting changes indicated by a set of baseline configuration settings. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and at least one memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The at least one memory (120) may be volatile memory (e.g., registers, cache, RAM), non-volatile memory (e.g., ROM, EEPROM, flash memory), or some combination of the two. The at least one memory (120) stores software (180) implementing inferring effects of configuration points on computing machine performance.

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include computer-readable storage media such as magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

Figure 2:
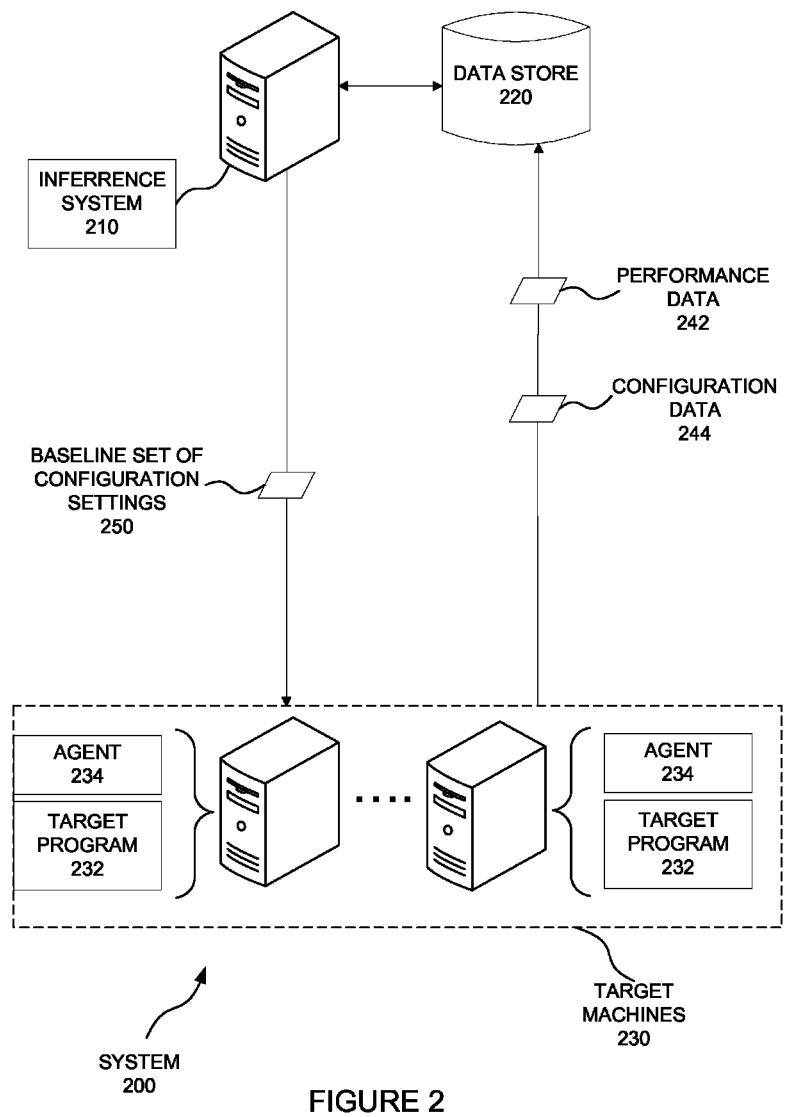
FIG. 2 is a schematic diagram of a system for inferring effects of configuration on performance.

II. System and Environment for Inferring Effects of Configuration on Performance FIG. 2 is a schematic diagram of a system (200) in conjunction with which one or more of the described embodiments may be implemented. The system (200) can include an inference system (210), which can access a data store (220). The data store (220) may be included in the inference system (210), or part of a separate system. The system (200) can also include target machines (230), which can each be running a target program (232) and an agent (234). The agent (234) on each machine (230) can access instrumentation to collect performance data (242) and configuration data (244) from the machine. Alternatively, the agent (234) may be running outside the target machine (230). For example, an agent (234) could be running on a machine that is managing one or more target machines (230) that are running the target program (232). Each agent (234) can be a program that runs in each target machine to identify support issues that may arise. The agent (234) may collect the data (242 and 244) using one or more of various techniques for collecting performance and configuration data from a running system, such as by making and receiving application programming interface calls, sending information request messages, polling states of physical devices, etc.

The target program (232) could be any of various programs, which could include one or more sub-programs or components. For example, a target program (232) can be a server application, such as a database server application, a Web server application, a file server application, etc. The target program (232) could be some other type of program, such as a word processing application, an operating system, etc.

The agents (234) can provide the performance data (242) and configuration data (244) to the data store (220). In one implementation, particular target machines (230) may provide such data (242 and 244) if user input has been provided at the target machine (230) to opt in or to decline to opt out of providing the data (242 and 244). Additionally, the agents (234) can take measures to avoid collecting personal identifiable information, and security precautions can be taken to protect data sent from the target machines (230) to the data store (220). The data store (220) can store the performance data (242) and configuration data (244), and can provide the data (242 and 244) to the inference system (210).

The inference system (210) can use the performance data (242) and configuration data (244) to infer effects of configuration points from the configuration data (244) on performance of the target machines (230) running the target program (232). In order to identify performance effects of configuration settings inside the system (200), the data (242 and 244) collected from the system can be mined to identify relationships of measurable configuration points to performance characteristics of particular target machines (230) under stress. Specific configuration points to be analyzed may be received in the inference system (210), such as where the configuration points are defined by user input. The configuration points may be any of various configuration points that can be set to different settings, such as registry keys, file versions, number of network cards, etc.

The data mining can include identifying periods of stress versus periods of non-stress for the target machines (230) being monitored. The periods of stress for the target machines (230) can be correlated and similar types of stress can be identified. This identification can be done by matching a stress profile that can include one or more stress types or characteristics. Stress profiles may be received from user input and/or modified based on analyzing the data (242 and 244). For example, if the target program (232) is a Web server program, a stress profile can be a count of requests per unit time that is above a specified level. As another example, if the target program (232) is a database server program, a stress profile can be a number of data writes and/or data reads in a database per unit time. As yet another example, a stress profile can be a processor sustained over a predefined percentage of full capacity for a specified period of time. As yet another example, a stress profile can be memory usage sustained over a certain percentage of available memory for a specified period of time. Additionally, a stress profile can include a combination of different kinds of stress. For example, if the target program (232) is a database server program, the stress profile could be a number of write actions per unit of time being above a specified level, and a write queue including a specified number of write requests, both for a specified period of time. As another example, a stress profile could include a medium-level network request threshold combined with a specified disk input/output level threshold.

Figure 3:
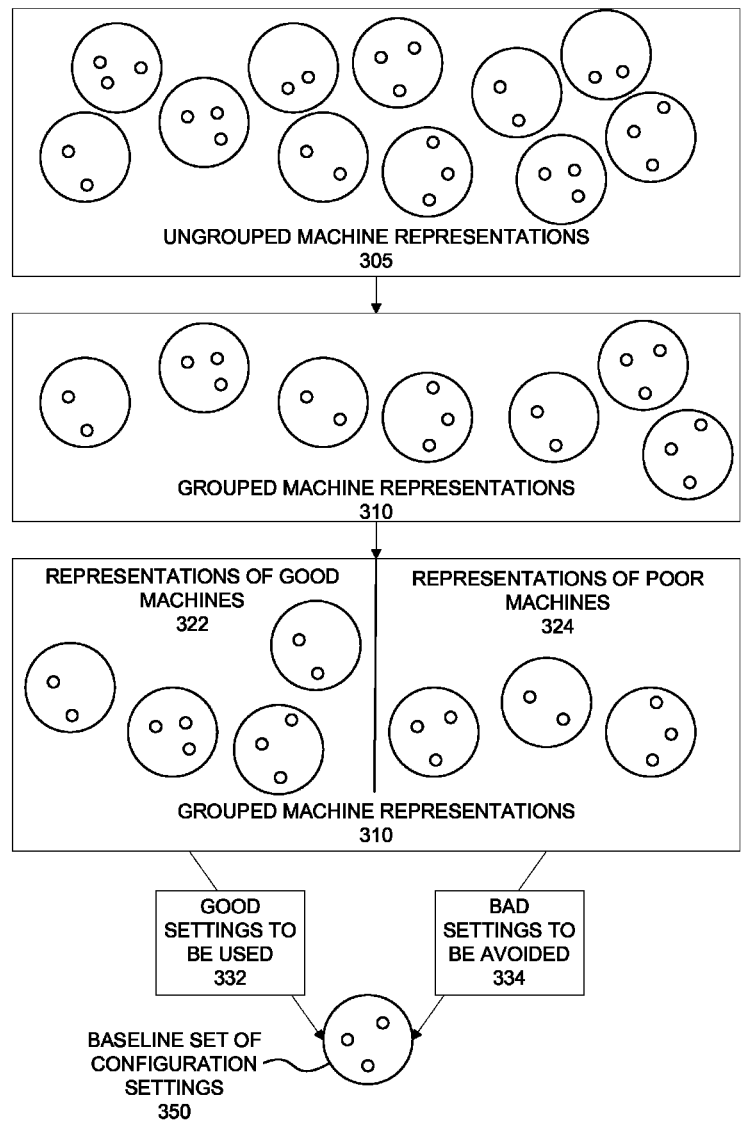
FIG. 3 is a schematic diagram illustrating analysis of machine representations.

Referring now to FIG. 3, a schematic representation of analyzing machine representations will be discussed. This analysis may be done in the inference system (210) of FIG. 2. The machine representations can include information regarding respective target machines, including performance data and configuration data. The periods of stress meeting characteristics of a performance profile can be correlated so that the ungrouped machine representations (305) can be grouped according to stress profiles into grouped machine representations (310) (i.e., the machines can be grouped according to stress types). FIG. 3 illustrates one machine representation group, but the analysis could include grouping the representations into multiple groups, with each group meeting a different stress profile. The grouping can allow machines of similar expected performance characteristics (i.e., those under similar types of stress) to be analyzed together in the inference system.

The inference system can identify configuration settings on the machines in a group, and infer their effect on the machines' performance. From groups of machines under similar types of stress, but across machines having different performance levels, it can be determined for each setting being analyzed whether that setting positively or negatively affects a specified type of performance being analyzed. For example, the grouped machine representations (310) can be distinguished into groups according to the performance levels of the respective machines being represented and analyzed. As illustrated in FIG. 3, the machine representations (310) may be grouped into representations of "good" machines (322) exhibiting good performance of a specified type, and representations of "poor" machines (324) exhibiting poor performance of the specified type. Other levels could also be specified such as a neutral performance level, a "very good" performance level, a "very poor" performance level, etc. The different performance levels can be defined by user input and/or automated grouping techniques. Also, the grouping of individual machines could be done automatically, and/or in response to user input. For example, a sorted list of machine performance levels can be displayed, and user input can be received to provide a specified cutoff between performance levels.

For each configuration point being analyzed, it can be determined whether a setting is more prevalent in the representations of good machines (322) or in the representations of poor machines (324). If a setting is not aligned with the representations of good machines (322) or the representations of poor machines (324) to a statistically significant extent (which may be determined according to specified parameters or determined directly from user input), the setting may be inferred to have a neutral effect on performance. For example, if the setting is the same across the representations of good machines (322) and the representations of poor machines (324), or if the setting is different across all the good and poor machine representations (310), it may be inferred that the setting does not affect the performance of the machines. As another example, if a configuration point is set to a first setting for the representations of good machines (322) but a second setting for the representations of poor machines (324), the configuration point can be said to affect performance. The first setting can be inferred to have a positive effect on performance, and the second setting can be inferred to have a negative effect on performance.

Once the settings and their relative effects on the machines' performance has been inferred as discussed above, good settings to be used (332) (i.e., those with an inferred positive effect on performance) and/or bad settings to be avoided (334) (i.e., those with an inferred negative effect on performance) can be specified as such in a baseline set of configuration settings (350).

Referring back to FIG. 2, the baseline set of configuration settings (250) can be used for future comparisons against the target machines (230) from which data was collected and/or other machines to identify issues that the machines may experience. For example, the baseline set of configuration settings (250) may be communicated to a machine (230), and the settings in the baseline set of configuration settings (250) may be suggested as settings for the machine (230). In one example, the settings of a machine (230) may be identified, and discrepancies between the settings of the machine and the baseline set of configuration settings (250) may be determined and presented. A tool, which can be a program module that is part of the agent (234) on the machine (230), may be used to change the configuration settings to match those of the baseline set of configuration settings (250). These changes may be made in response to an automated comparison to the baseline set of configuration settings (250), or the changes may be made in response to user input (user input indicating the changes, user input approving the changes, etc.).

After the baseline set of configuration settings (250) has been defined, those settings can be analyzed again at different times and/or using different machines to see if the baseline set of configuration settings (250) are still valid. This could result in the baseline set of configuration settings (250) being modified as a result of such additional analysis. Also, the baseline set of configuration settings (250) may be displayed and user input may be received to approve and/or modify the settings. For example, this user input may be received from one or more software development experts. Such modified baseline set of configuration settings (250) can be used in the same way as discussed above, which can result in changes being made to settings of target machines (230) and/or other machines where the baseline set of configuration settings (250) are used.

III. Techniques for Inferring Effects of Configuration on Performance

Several techniques for inferring effects of configuration on performance will now be discussed. Each of these techniques can be performed in a computing environment. For example, each technique may be performed in a computer system that includes at least one processor and at least one memory including instructions stored thereon that when executed by the at least one processor cause the at least one processor to perform the technique (one or more memories store instructions (e.g., object code), and when the processor(s) execute(s) those instructions, the processor(s) perform(s) the technique). Similarly, one or more computer-readable storage media may have computer-executable instructions embodied thereon that, when executed by at least one processor, cause the at least one processor to perform the technique.

Figure 4:
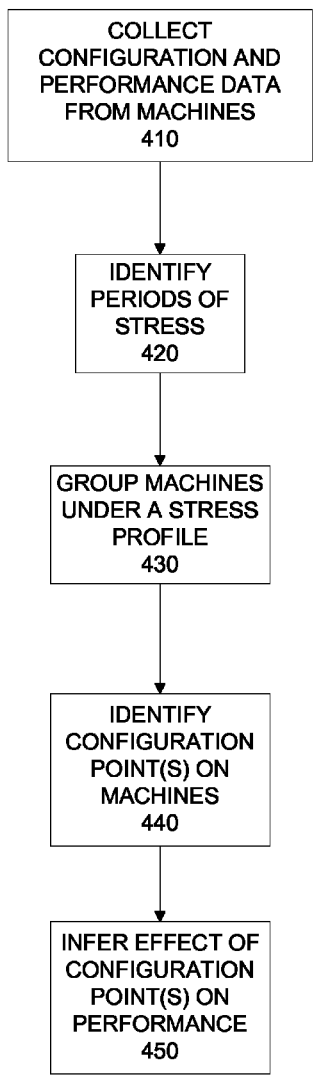
FIG. 4 is a flowchart of a technique for inferring effects of configuration on performance.

Referring to FIG. 4, a technique for inferring effects of configuration on performance will be described. The technique can include collecting (410) configuration data and performance data from a plurality of computing machines running a target program. Periods of stress for the computing machines can be identified (420) using the performance data. A set of the computing machines can be grouped (430) under a specified stress profile using the performance data, and one or more configuration points can be identified (440) on the set of machines. An effect of each of the one or more configuration points on performance of the set of machines can be inferred (450) using the configuration data and the performance data.

The inferred effect of the configuration point(s) can be used to determine a baseline set of configuration settings. At least a portion of the baseline set of configuration settings may be communicated to computing machine(s), and/or suggested to computing machine(s). For example, one or more changes on one or more computing machines may be suggested to match at least a portion of the baseline set of configuration settings. Additionally, one or more settings in a set of computing machine(s) can be changed to match at least a portion of the baseline set of configuration settings. Also, the baseline set of configuration settings may be changed after analyzing additional configuration data and performance data. For example, the baseline set of configuration settings may be changed in response to the analysis of the additional configuration and performance data.

Identifying (420) periods of stress may include receiving user input defining one or more stress definitions, and analyzing the performance data to identify one or more machines meeting at least one of the stress definition(s). Also, grouping (430) the set of machines under the specified stress profile can include analyzing the performance data to determine whether one or more machines producing the performance data meets the stress profile. The stress profile may define a type of stress as a combination of different types of stress, or a single type of stress. User input that defines the stress profile may be received.

Inferring (450) an effect of each of the one or more configuration points can include, for each machine in the set of machines, determining a performance level. For example, a performance level could indicate a level of positive effect on performance of a specified type, a level of negative effect on performance of a specified type, or a neutral effect on performance of a specified type. Inferring (450) an effect can include, for each of the configuration point(s), identifying machines having a particular setting for that configuration point and determining a performance level for that machine. Inferring (450) an effect may include producing a value representing a number (e.g., a percentage) of machines having a specified setting for a configuration point and a specified performance level. For example, an effect of a setting may be inferred to be a positive effect if a specified percentage (e.g., greater than 70%, greater than 80%, greater than 90%, etc.) of configuration points with that setting are on machines with a performance level that is determined to be good according to specified parameters.

Figure 5:
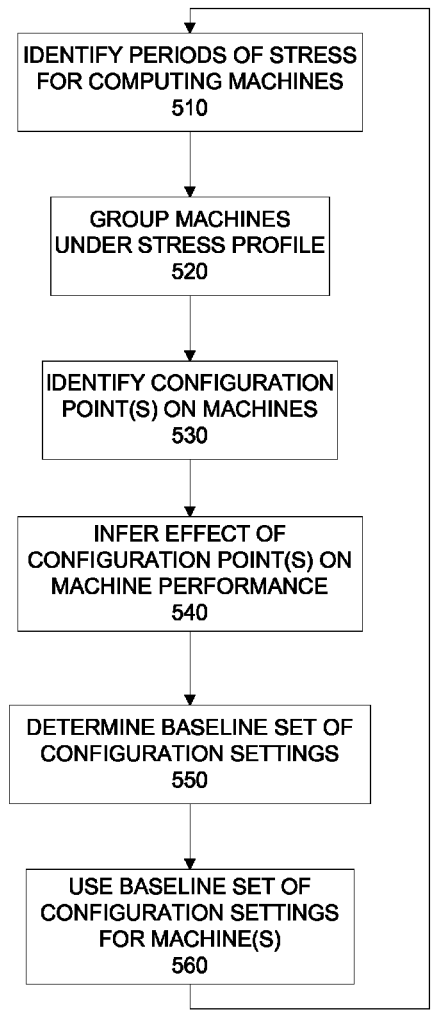
FIG. 5 is a flowchart of another technique for inferring effects of configuration on performance.

Referring to FIG. 5, another technique for inferring effects of configuration on performance will be described. The technique can include identifying (510) periods of stress for multiple computing machines running a target program. The identification (510) can be done by analyzing performance data. A set of machines can be grouped (520) under a specified stress profile using the performance data. This grouping (520) can include determining that the set of machines meets characteristics of the stress profile. Grouping (520) the set of machines under the specified stress profile can include analyzing the performance data to determine whether one or more machines producing the performance data meets the stress profile. The stress profile may be defined in various ways to define a specified type of stress, such as by defining a combination of different types of stress or a single type of stress.

The technique can also include identifying (530) one or more configuration points on the set of machines. An effect of each of the one or more configuration points on performance of the set of machines can be inferred (540) using configuration data for the set of machines. The inferring (540) can be performed using the configuration data and the performance data. Inferring (540) may include, for each of the configuration point(s), identifying machines having a particular setting for that configuration point and determining a performance level for that machine. Inferring (540) may further include producing a value representing a number of machines having a specified setting for a configuration point and a specified performance level.

The inferred effects of the configuration point(s) can be used to determine (550) a baseline set of configuration settings. The technique can further include using (560) the baseline set of configuration settings for one or more computing machines. For example, using (560) the baseline set of configuration settings can include communicating at least a portion of the baseline set of configuration settings to one or more computing machines and/or suggesting at least a portion of the baseline set of configuration settings to one or more computing machines. Using (560) the baseline set of configuration settings can include changing one or more settings in a set of one or more computing machines to match at least a portion of the baseline set of configuration settings.

The technique may also include changing the baseline set of configuration settings after analyzing additional configuration data and performance data. For example, this may include repeating steps of identifying (510) periods of stress, grouping (520), identifying configuration point(s) (530), inferring (540) effects, and determining (550) the changed baseline set of configuration settings. The new baseline set of configuration settings can then be used (560). Changing the baseline set of configuration settings may also include collecting additional performance and/or configuration data, such as collecting additional data after the baseline set of configuration settings have been used (560). As is illustrated by the continuous loop in the flowchart of FIG. 5, this analysis and changing of the baseline set of configuration settings may be repeated so that the baseline set can be adjusted as conditions change and/or more data becomes available for analysis.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method, comprising:
   collecting configuration data and performance data from a plurality of computing machines running a target program, the performance data representing performance of the plurality of computing machines during one or more previous time periods and the configuration data representing settings of configuration points of the plurality of computing machines during the one or more previous time periods;
   using a computer system to group a set of the computing machines under a stress profile using the performance data, the grouping of the set of the machines under the stress profile comprising analyzing the performance data to determine that the set of the machines have met the stress profile for at least one of the one or more previous time periods, the grouping of the set of the machines further comprising identifying the set of the machines with a group and indicating the set of the machines have met the stress profile;
   using the computer system to identify one or more configuration points on the set of computing machines; and
   using the computer system to infer an effect of one or more of the one or more configuration points on performance of the set of computing machines using the configuration data and the performance data.

2. The method of claim 1, further comprising using the one or more inferred effects of the one or more configuration points to determine a baseline set of configuration settings.

3. The method of claim 2, further comprising communicating at least a portion of the baseline set of configuration settings to one or more computing machines.

4. The method of claim 2, further comprising suggesting one or more changes on one or more computing machines to match at least a portion of the baseline set of configuration settings.

5. The method of claim 2, further comprising changing one or more settings in a set of one or more computing machines to match at least a portion of the baseline set of configuration settings.

6. The method of claim 2, further comprising changing the baseline set of configuration settings after analyzing additional configuration data and performance data.

7. The method of claim 1, further comprising identifying periods of stress for the computing machines using the performance data, wherein identifying periods of stress comprises receiving user input defining one or more stress definitions, and analyzing the performance data to identify one or more machines meeting at least one of the one or more stress definitions.

8. The method of claim 1, wherein the stress profile defines a combination of different types of stress.

9. The method of claim 8, further comprising receiving user input defining the stress profile.

10. The method of claim 1, wherein inferring an effect of each of the one or more configuration points comprises, for each machine in the set of computing machines, determining a performance level.

11. The method of claim 10, wherein inferring an effect further comprises for each of the one or more configuration points, identifying machines having a particular setting for that configuration point and determining a performance level for that machine.

12. The method of claim 11, wherein inferring an effect comprises producing a value representing a number of machines having a specified setting for a configuration point and a specified performance level.

13. A computer system comprising:
at least one processor; and
at least one memory comprising instructions stored thereon that when executed by the at least one processor cause the at least one processor to perform acts comprising:
grouping a set of computing machines under a stress profile using performance data, the grouping of the set of the machines under the stress profile comprising analyzing the performance data to determine that the set of the machines have met the stress profile for at least one of one or more previous time periods, the grouping of the set of the machines further comprising identifying the set of the machines with a group and indicating the set of the machines have met the stress profile;
identifying one or more configuration points on the set of the machines;
inferring an effect of each of the one or more configuration points on performance of the set of the machines using configuration data for the set of the machines and using the performance data; and
using the one or more inferred effects of the one or more configuration points to determine a baseline set of configuration settings.

14. The computer system of claim 13, wherein the acts further comprise communicating at least a portion of the baseline set of configuration settings to one or more computing machines.

15. The computer system of claim 13, wherein the acts further comprise suggesting at least a portion of the baseline set of configuration settings to one or more computing machines.

16. The computer system of claim 13, wherein the acts further comprise changing one or more settings in a set of one or more computing machines to match at least a portion of the baseline set of configuration settings.

17. The computer system of claim 13, wherein the acts further comprise changing the baseline set of configuration settings after analyzing additional configuration data and performance data.

18. The computer system of claim 13, wherein the stress profile defines a combination of different types of stress.

19. The computer system of claim 13, wherein inferring an effect comprises:
for each of the one or more configuration points, identifying machines having a particular setting for that configuration point and determining a performance level for that machine; and
producing a value representing a number of machines having a specified setting for a configuration point and a specified performance level.

20. One or more computer-readable storage media having computer-executable instructions embodied thereon that, when executed by at least one processor, cause the at least one processor to perform acts comprising:
identifying periods of stress for a plurality of computing machines running a target program by analyzing performance data, the identifying of the periods of stress comprising analyzing the performance data to identify one or more machines meeting at least one of one or more stress definitions for at least one of one or more previous time periods;
grouping a set of machines under a type of stress using the performance data, grouping the set of machines under the type of stress comprising analyzing the performance data to determine that one or more machines producing the performance data has met a stress profile that defines the type of stress for at least one of the one or more previous time periods, the grouping of the set of machines further comprising identifying the set of machines with a group and indicating the set of machines have been under the type of stress;
identifying one or more configuration points on the set of machines; and
inferring an effect of each of the one or more configuration points on performance of the set of machines using configuration data for the set of machines and using the performance data, the inferring of the one or more effects comprising:
for each of the one or more configuration points, identifying machines having a particular setting for that configuration point and determining a performance level for that machine; and
producing a value representing a number of machines having a specified setting for a configuration point and a specified performance level;
using the effect of the one or more configuration points to determine a baseline set of configuration settings;
suggesting the baseline set of configuration settings to one or more computing machines; and changing the baseline set of configuration settings after analyzing additional configuration data and performance data.

\* \* \* \* \*